United States Patent
Fujii et al.

(10) Patent No.: US 9,115,803 B2
(45) Date of Patent: Aug. 25, 2015

(54) METHODS AND SYSTEMS FOR OPERATING A TRANSMISSION

(71) Applicant: Ford Global Technologies, LLC, Dearborn, MI (US)

(72) Inventors: Yuji Fujii, Ann Arbor, MI (US); Marvin Paul Kraska, Dearborn, MI (US); Jeffrey Allen Doering, Canton, MI (US); Alex O'Connor Gibson, Ann Arbor, MI (US); Joseph F. Kucharski, Livonia, MI (US); Gregory Michael Pietron, Canton, MI (US); Eric Hongtei Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 14/012,869

(22) Filed: Aug. 28, 2013

(65) Prior Publication Data

US 2015/0066316 A1 Mar. 5, 2015

(51) Int. Cl.
*F16H 61/02* (2006.01)

(52) U.S. Cl.
CPC .... *F16H 61/0213* (2013.01); *F16H 2061/0216* (2013.01)

(58) Field of Classification Search
CPC ......... F16H 59/08; F16H 59/10; F16H 59/12; F16H 59/04; F16H 2061/6616; F16H 2061/6617; F16H 2061/6643; Y10T 74/19251
See application file for complete search history.

(56) References Cited

U.S. PATENT DOCUMENTS

| | | | | |
|---|---|---|---|---|
| 6,363,805 | B1* | 4/2002 | Marchart | 74/335 |
| 6,544,141 | B1* | 4/2003 | Fuchs et al. | 477/44 |
| 6,966,866 | B2* | 11/2005 | Ando et al. | 477/4 |
| 7,198,335 | B2 | 4/2007 | Choi | |
| 7,628,236 | B1 | 12/2009 | Brown | |
| 7,739,021 | B2 | 6/2010 | Wegeng et al. | |
| 8,246,510 | B2 | 8/2012 | Michishita et al. | |
| 8,246,515 | B2 | 8/2012 | Zhao | |
| 8,246,519 | B2 | 8/2012 | Ohkubo | |
| 8,831,842 | B2* | 9/2014 | Dufford | 701/54 |
| 2007/0144294 | A1* | 6/2007 | Sickart | 74/473.18 |
| 2008/0060861 | A1 | 3/2008 | Baur et al. | |
| 2012/0083958 | A1 | 4/2012 | Ballard | |
| 2012/0138395 | A1 | 6/2012 | Curtis et al. | |
| 2013/0035817 | A1 | 2/2013 | Bahar et al. | |
| 2014/0024490 | A1* | 1/2014 | Bangura et al. | 477/3 |

FOREIGN PATENT DOCUMENTS

| | | |
|---|---|---|
| CN | 102770300 A | 11/2012 |
| GB | 2479707 A | 10/2011 |
| GB | 2479707 B | 10/2012 |
| WO | 2011101646 A1 | 8/2011 |

* cited by examiner

*Primary Examiner* — Edwin A Young
(74) *Attorney, Agent, or Firm* — David Kelley; Alleman Hall McCoy Russell & Tuttle LLP

(57) ABSTRACT

Systems and methods for operating and interfacing to a transmission of a vehicle are presented. In one example, a human machine interface allows a driver to assign gear ratios or simulated gear ratios to gear position slots of a shifter. The assignment of gear ratios to gear position slots of a shifter may allow a driver to experience the feeling of driving a manually shifted transmission without having to operate a clutch.

20 Claims, 9 Drawing Sheets

METHODS AND SYSTEMS FOR OPERATING A TRANSMISSION

FIELD

The present description relates to a system and method for operating and interfacing with a transmission. The methods may be particularly useful for transmission having a plurality of actual or simulated gears.

BACKGROUND AND SUMMARY

An engine and/or motor may be coupled to a gear box or transmission that includes a gear ratio that converts engine or motor rotation to a speed suitable for propelling a vehicle. The transmission or gear box may reduce or increase engine or motor speed depending on the gear ratio of the transmission or gear box. The number of gears a transmission may have has steadily increased in an effort to improve vehicle fuel economy. For example, some automatic transmissions have eight forward gears and transmissions having more than 12 forward gears may be on the horizon. Further, as the number of transmission gears increase, less control of gear shifting may be provided to a driver since shifting through such a large number of gears may be cumbersome.

On the other hand, some hybrid vehicles have a single fixed ratio gear box while other hybrid vehicles utilize a continuously variable transmission (CVT). Such systems may provide for smooth application of power from the motive source (e.g., motor or engine) to the vehicle wheels; however, the driver may be deprived of the fun-to-drive aspect of being able to control torque applied to the vehicle wheels during vehicle cornering, acceleration, and deceleration.

Consequently, drivers of vehicles having advanced drivelines may not have the level of transmission control that they may desire. Further, even if drivers were given control over all aspects of transmission operation, the driver may be overwhelmed by the complexity and coordination that may be necessary to operate the transmission in a desired manner.

The inventors herein have recognized the above-mentioned disadvantages and have developed a method for operating a transmission, comprising: assigning a first number of transmission gears to a first number of gear shifter position slots, the first number of transmission gears greater than the first number of gear shifter position slots; and shifting a transmission in response to a position of a gear shifter in a gear shifter position slot, the gear shifter position slot included in the first number of gear shifter positions.

By allowing a driver to assign more than one gear to a gear shifter slot, it may be possible to provide the technical result of allowing a driver to experience shifting similar to manual transmission shifting for transmissions that have only one gear ratio or a large number of gear ratios that would otherwise be cumbersome to shift through. For example, gears of a twelve speed transmission may be assigned to six gear shifter position slots so that each gear shifter slot is assigned two gear ratios. The transmission may operate in one of the gear ratios assigned to the gear shifter slot at a time. In some examples, the transmission may be operated in a first gear assigned to the gear shifter slot and then be shifted to the other gear assigned to the gear shifter slot based on driveline operating conditions. In other examples, the transmission may be operated in only one or less than the total number of gear ratios assigned to the gear shifter slot.

The present description may provide several advantages. Namely, the approach may improve a driver's experience driving a vehicle. Further, the approach may simplify manual shifting for a driver of a vehicle that includes a large number of gear ratios. Further still, the approach may allow a driveline without a plurality of gear ratios to provide the feeling of shifting between multiple gear sets.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
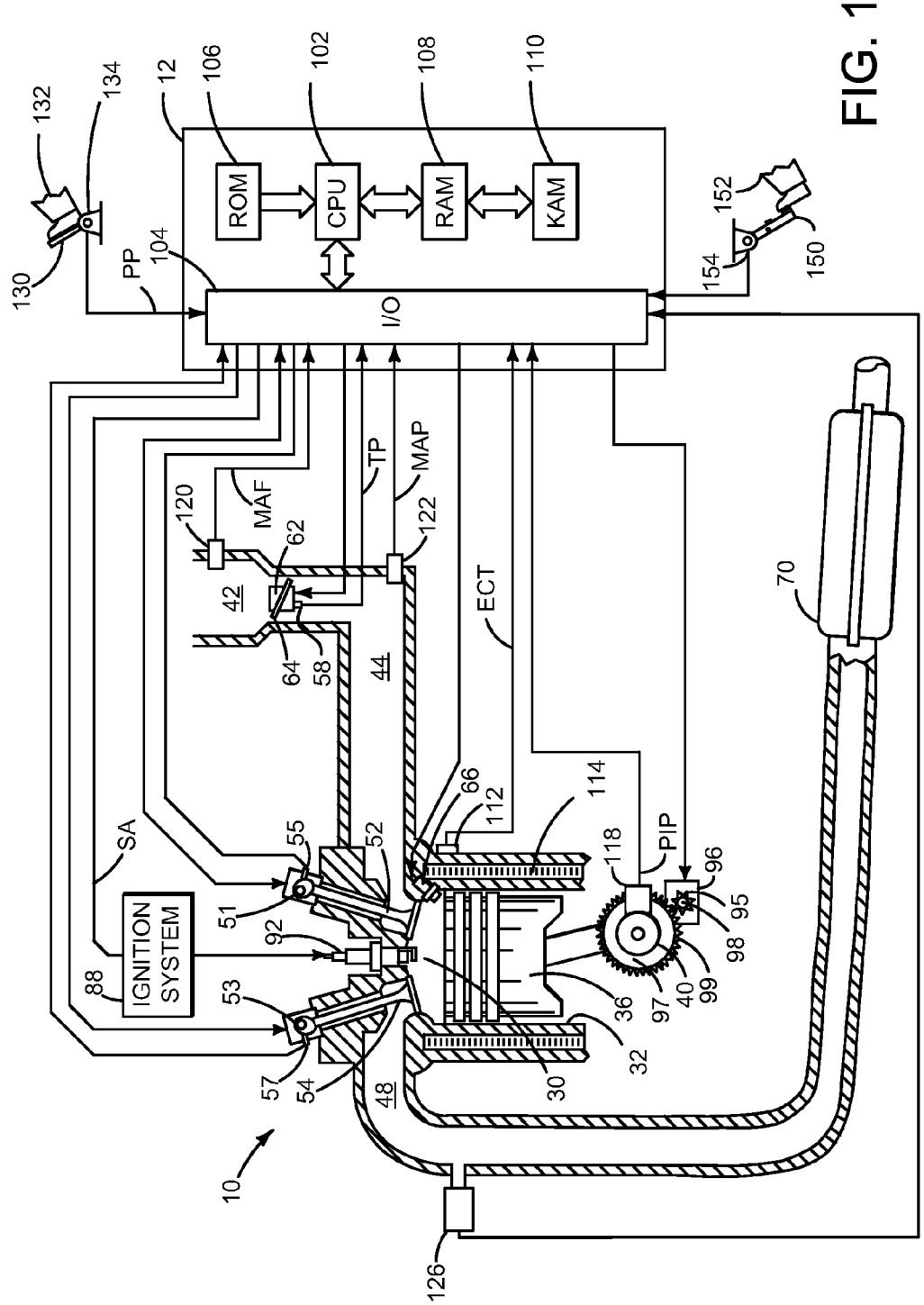
FIG. 1 is a schematic diagram of an engine.
Figure 2:
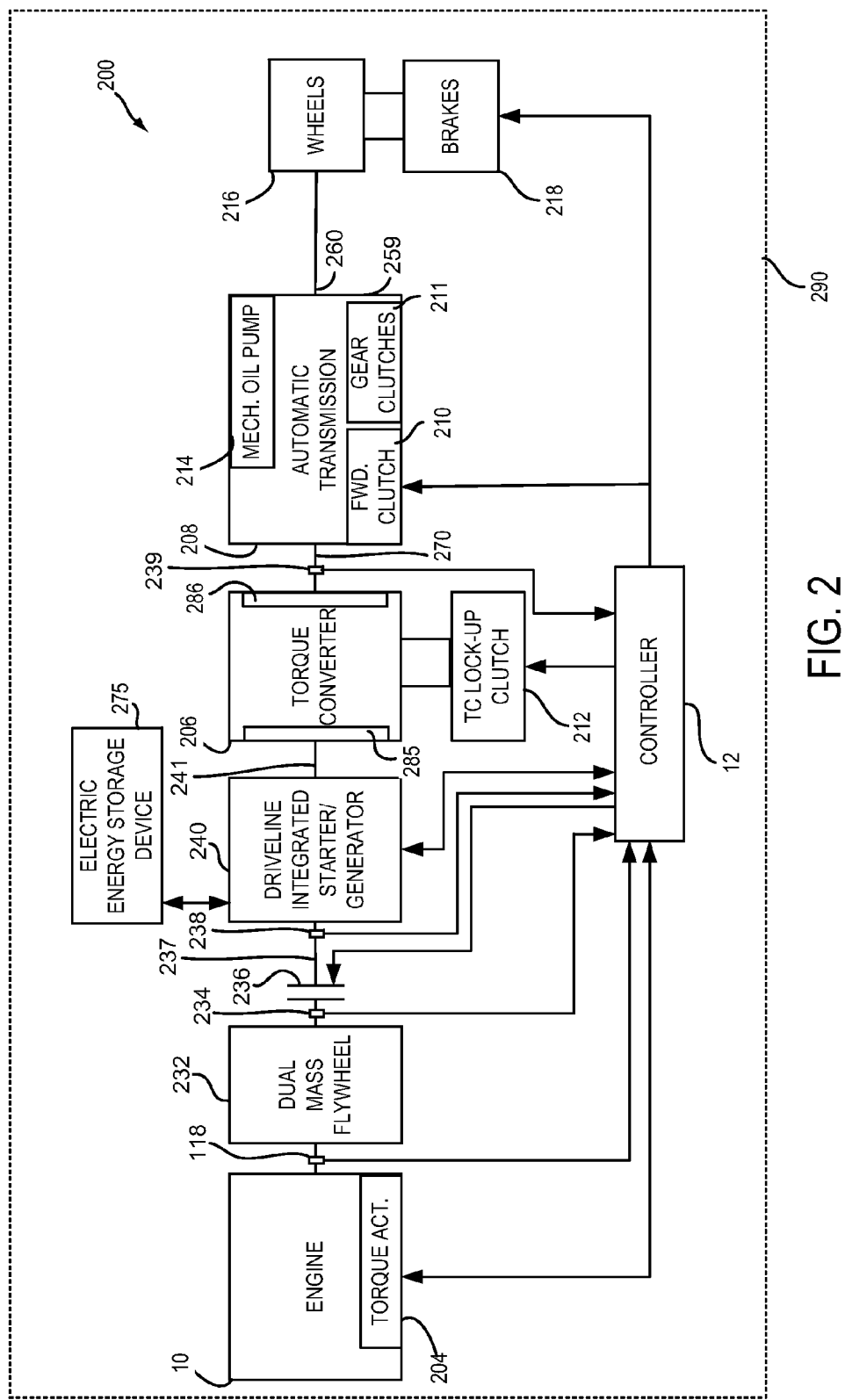
FIG. 2 shows a first example vehicle driveline configuration.
Figure 3:
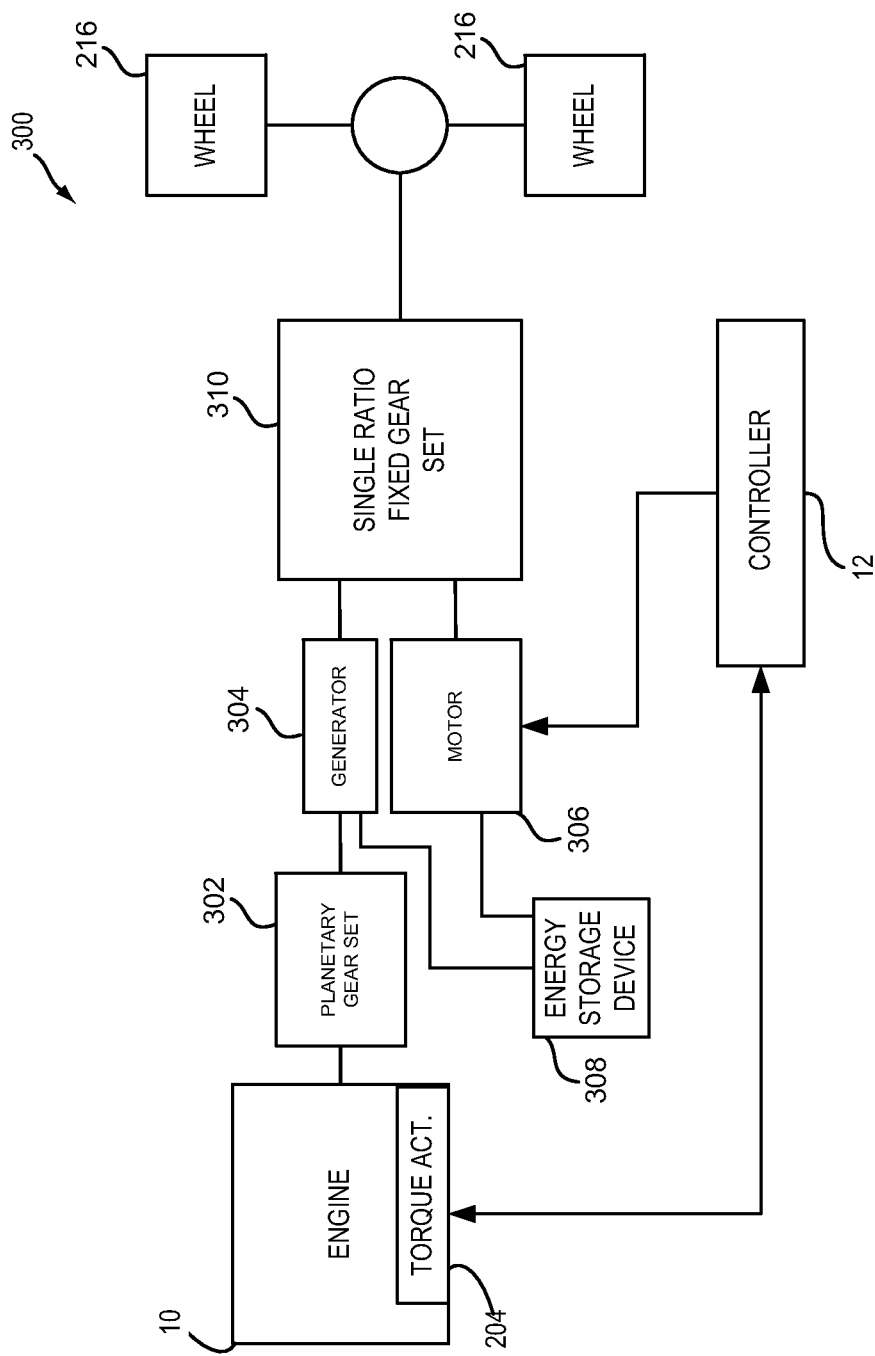
FIG. 3 shows a second example vehicle driveline configuration.
Figure 4:
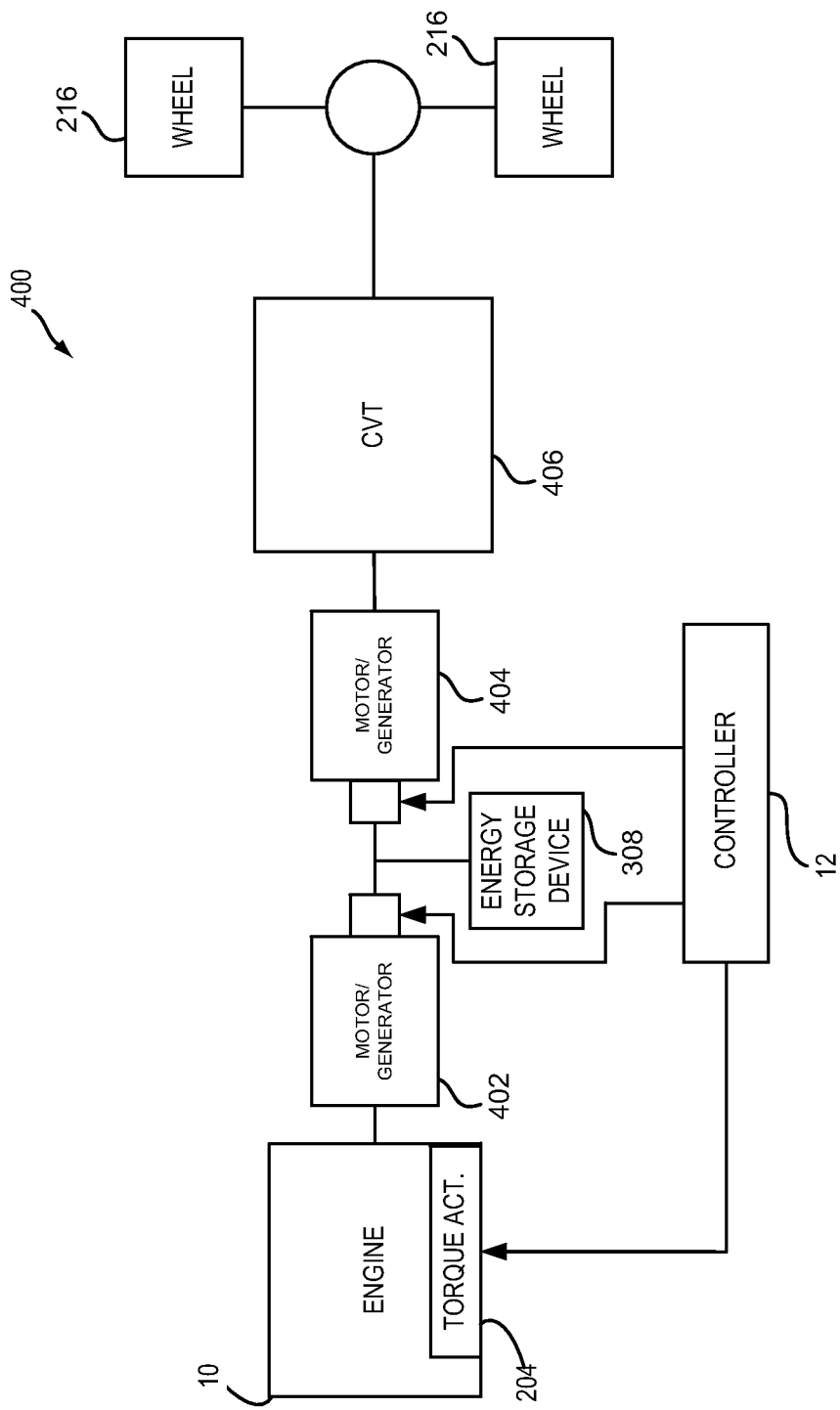
FIG. 4 shows a third example vehicle driveline configuration.

The present description is related to a human machine interface and operating a vehicle driveline. The vehicle driveline may be comprised of an engine and a transmission without a motor. Alternatively, the vehicle driveline may be a hybrid vehicle driveline that includes an engine and a driveline integrated starter/generator (DISG) or electric machine as shown in FIGS. 1-2. In still other examples, the driveline may include a fixed gear set as is shown in FIG. 3 or a continuously variable transmission as is shown in FIG. 4. Example manually controlled shifters are shown in FIGS. 5A-6C. The manually controlled shifters may be assigned actual or simulated transmission gears via a human machine interface as shown in FIGS. 7A and 7B. The driveline and human machine interface may operate according to the method shown in FIG. 8.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2-4. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12.

Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-25) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch (es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

Referring now to FIG. 3, an example of an alternative driveline 300 is shown. Driveline 300 includes engine 10 and torque actuator 204 as described in FIGS. 1 and 2. Engine 10 provides torque to planetary gear set 302 and generator 304 operates in a speed control mode to control engine torque delivery to single ratio gearing system 310. Output from generator 304 provides electrical energy to energy storage device 308 and motor 306. Electrical energy storage device 308 may supply electrical power to motor 306 when engine 10 is not operating. Electrical energy storage device may be a battery, capacitor, or other electrical energy storage device. Motor 306 may also be operated in a generator mode for regenerative braking. Torque from engine 10 and motor 306 may be combined in single ratio gearing system 10 to provide torque to vehicle wheels 216 via a mechanical power path. Controller 12 controls operation of engine 10, generator 304, and motor 306 to adjust power supplied to vehicle wheels 216. Thus, the driveline of FIG. 3 does not include a transmission with multiple fixed gear ratios for delivering engine and motor power to vehicle wheels.

Referring now to FIG. 4, another example alternative driveline 400 is shown. Driveline 400 includes engine 10 and torque actuator 204 as described in FIGS. 1 and 2. Engine 10 provides torque to first motor/generator 402 and electrical power from first motor/generator 402 may be provided to energy storage device 308 and second motor/generator 404. Second motor/generator 404 converts electrical energy from battery and/or first motor/generator 402 into mechanical energy and transmits the mechanical energy to continuously variable transmission (CVT) 406. A belt within CVT 406 adjusts a speed/torque transfer of mechanical energy from second motor/generator 404 to vehicle wheels 216. Controller 12 adjusts engine torque and operation of first motor/generator 402 and operation of second motor/generator 404 to provide a driver demand torque as requested by a driver.

Figure 5A:
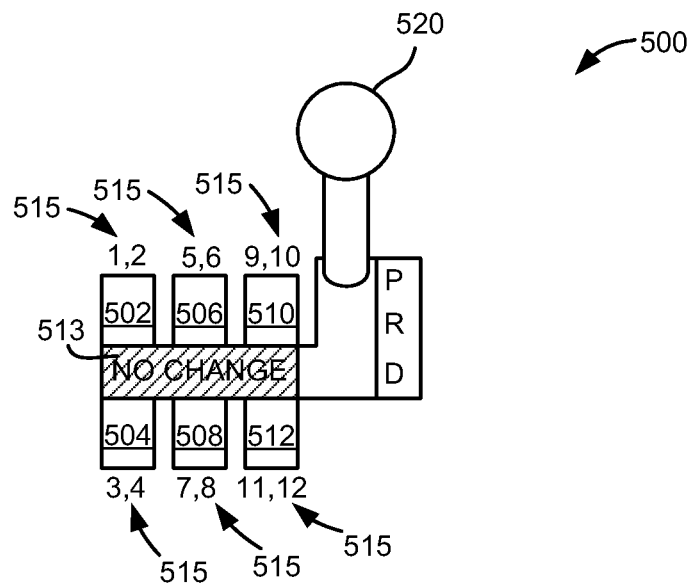
FIGS. 5A-6C show example manually operated shifters.

Referring now to FIG. 5A a first example shifter 500 is shown. Shifter 500 includes a shift lever 520 that may be move to park P, reverse R, and drive D. Further, shift lever 520 may initiate manual shifting mode when positioned in no change area 513 shown as cross hatched or in manual mode gear shifter position slots 502-512. When shift lever 520 is in no change area 513, the state of transmission operation selected by the previous position of shift lever 520 is held. For example, if shift lever 520 is moved from D across the no change area to between manual mode gear shifter position slots 502 and 504, the transmission remains in drive and operates according to drive mode. In drive mode, the transmission may automatically shift between all forward gears without driver inputting specific shifting commands. If the vehicle does not have selectable gear ranges such as shown in FIGS. 3 and 5, the transmission delivers power to vehicle wheels without shifting gears or simulating shifting gears in drive mode.

In some drive modes for some driveline configurations, the transmission may be shifted (e.g., the system of FIG. 2) between a number of gear ratios that is greater than the number of manual mode gear shifter position slots via the manual operation of moving shift lever 520 between manual mode gear shifter position slots 502-512. In other words, the transmission may be shifted manually via input from shift lever 520 without manually activating a clutch. In other drive modes for other driveline configurations, a motor simulates gear shifting via changing motor output torque as a function of selected simulated gear (e.g., the system of FIGS. 3 and 4) when the shift lever 520 is manually moved between manual mode gear shifter position slots (e.g., manual mode shifting).

In this example, each manual mode gear shifter position slot 502-512 is assigned two transmission gears for simulating shifting or for actually shifting between twelve transmission gear sets as indicated by the transmission gear assignments 515. The first manual mode gear shifter position slot 502 is assigned gears one and two as indicated by the transmission gear assignment 515 above the slot. The second manual mode gear shifter position slot 504 is assigned gears three and four as indicated by the transmission gear assignment 515 above the second slot. Similarly, transmission gears five through twelve are assigned to manual mode gear shifter position slots three through six. In this way, one or more than one actual or simulated transmission gear may be assigned to a manual mode gear shifter position slot.

If two or more gears are assigned to a manual mode gear shifter position slot, the driver may select only one of the gears to be operational while the shift lever 520 is in a particular manual mode gear shifter position slot. Alternatively, the driver may select operation of certain selected gears while skipping or not shifting to other gears that are assigned to the manual mode gear shifter position slot.

For example, different from the gear assignment shown in FIG. 5A, if gears 1-3 are assigned to a first manual mode gear shifter position slot, the driver may select gears 1 and 3 to be operational. Thus, the transmission may first be shifted or be simulated shifted in first gear at low vehicle speeds when shift lever 520 is in the first manual mode gear shifter position slot. As vehicle speed increases, the transmission may be automatically (e.g., without specific driver input to shift transmission gears) shifted or simulated shifted into third gear from first gear. The transmission is held in third gear unless shift lever 520 is moved or vehicle speed is reduced, thereby allowing the transmission to be automatically shifted from third gear back to first gear. In this way, second gear may be skipped via a skip shift from first to third gear. If the driver manually changes the position of shift lever 520 from the first manual mode gear shifter position slot to the second manual mode gear shifter position slot, the transmission will shift or simulate shifting from either first gear or third gear into fourth gear or another gear assigned to the second manual mode gear shifter position slot.

Figure 5B:
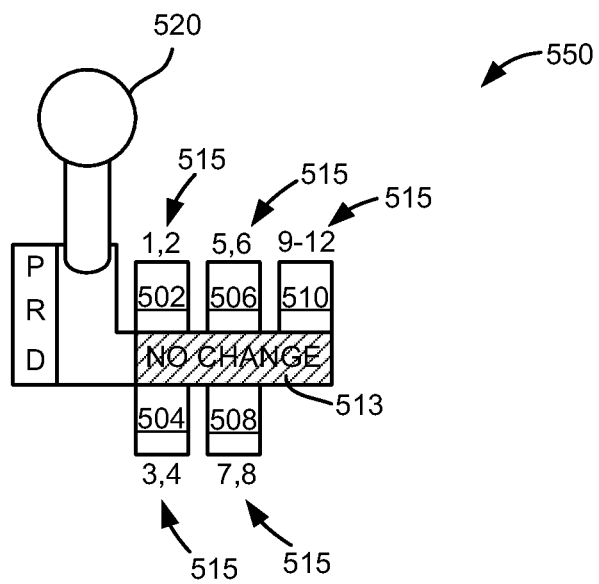

Referring now to FIG. 5B, another example manual shifter 550 is shown. In this example, shift lever 520 may be moved through positions P, R, and D in the same manner as described in FIG. 5A. Further, transmission gears 1-12 are assigned to manual mode gear shifter position slots 502-510; however, this example includes only five manual mode gear shifter position slots. The driver has assigned two gears for each manual mode gear shifter position slot, except for manual mode gear shifter position slot 510 which is assigned gears 9-12 as indicated by the transmission gear assignment 515. In this way, the driver may tailor the shift pattern to manually control gear shifting through lower gears while allowing the transmission to shift automatically through higher gears.

Figure 6A:
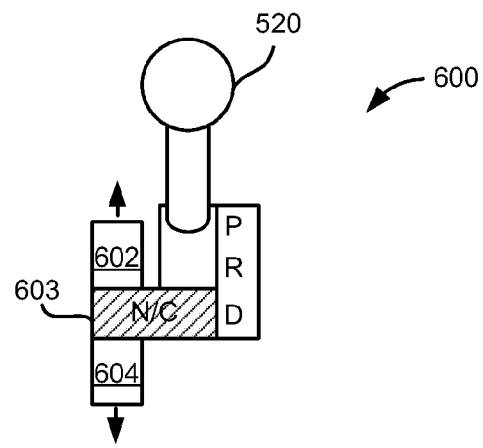
Figure 7A:
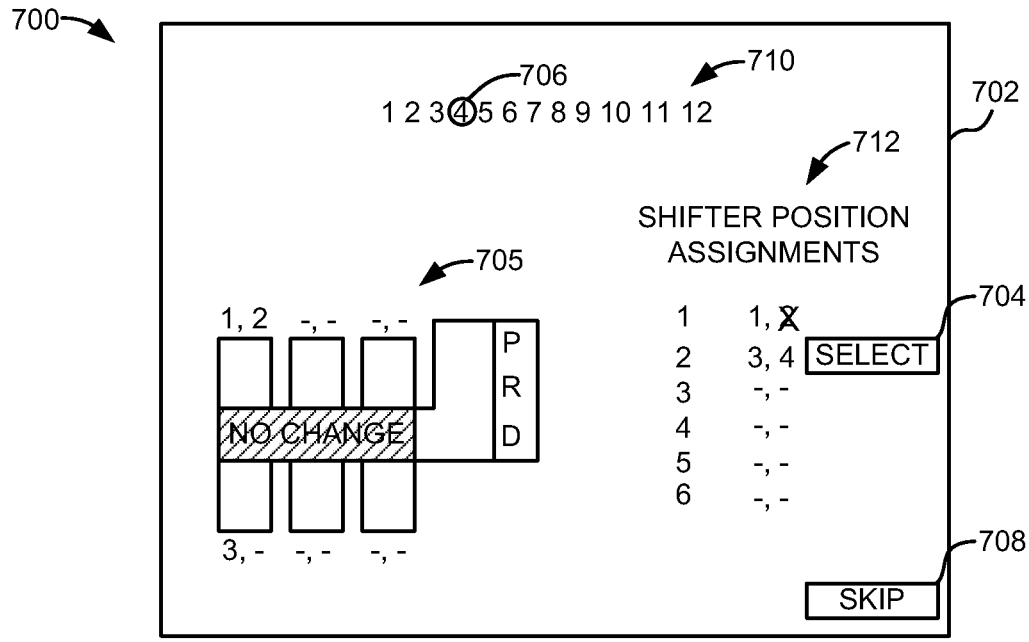
FIGS. 7A and 7B show an example human machine interface for operating a vehicle driveline.
Figure 7B:
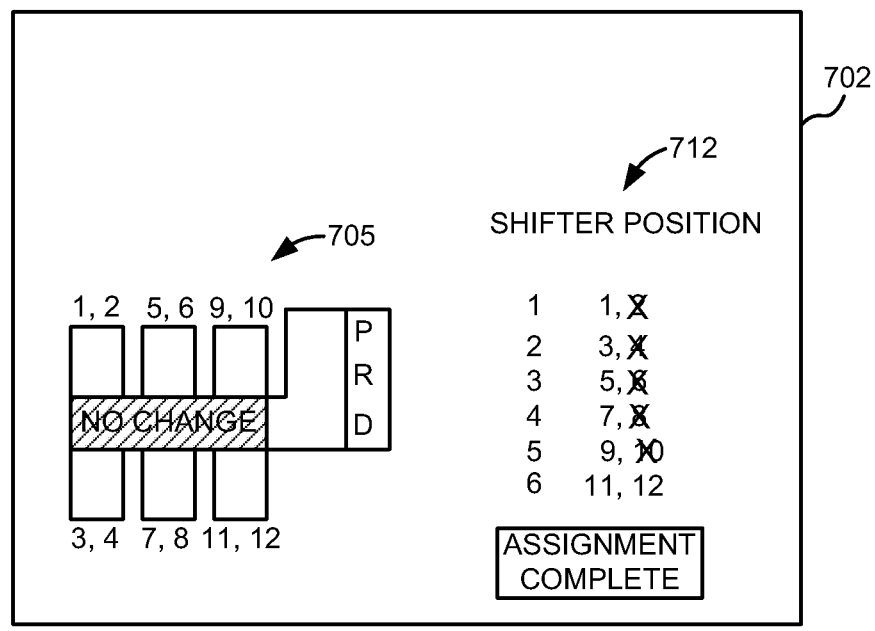

Referring now to FIG. 6A, another example shifter 600 is shown. Shifter 600 includes a shift lever 520 that may be manually moved between P, R, and D as previously described for the shifter in FIG. 5A. Shifter 600 also includes a first manual mode gear shifter position slot 602 and a second manual mode gear shifter position slot 604. These manual mode gear shifter position slots upshift and downshift the transmission from its present gear when entered by shift lever 520. All transmission gears may be assigned to the first and second manual mode gear shifter position slots. For example, if shift lever 520 is in drive D and in third gear, the driver may move shift lever 520 to manual mode gear shifter position slot 602 to upshift the transmission into fourth gear. Alternatively, the driver may move shift lever 520 to manual mode gear shifter position slot 604 to downshift the transmission into second gear. Shift lever 520 returns to no change (N/C) region 603 via a spring when the driver releases shift lever 520. The transmission stays in its present gear after being shifted manually to either manual mode gear shifter position slot 602 or 604. The transmission may be shifted through all gears in this way.

Alternatively, the driver may define only a portion of available gears to be shifted into during manual mode using shift lever 520. For example, if the transmission includes twelve gear ratios, or if twelve gear ratios are simulated, only gears one, three, five, seven, nine, and eleven may be shifted to via shifter 520 moving between manual mode gear shifter position slots 602 and 604. In this way, all transmission gears or a portion of transmission gears may be manually shifted to using shifter 600.

Figure 6B:
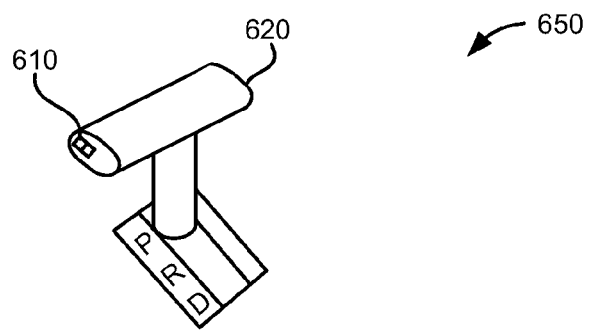

Referring now to FIG. 6B, an alternative shifter 650 is show. Shift lever 620 includes a toggle switch 610 for commanding upshifting and downshifting when shift lever 620 is in the drive D position. Toggle switch 610 operates the same as when shifter 520 of FIG. 6A is moved into manual mode gear shifter position slots 602 and 604. Further, all transmission gears or a subset of transmission gears may be shifted into as described at in FIG. 6A when toggle switch 610 is actuated.

Figure 6C:
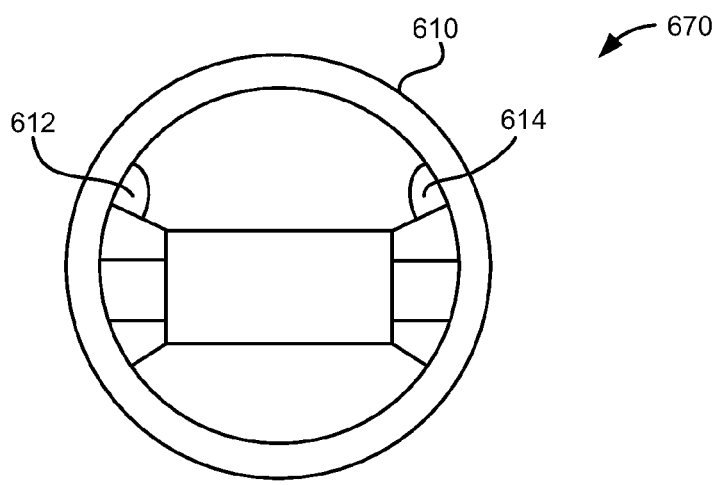

Referring now to FIG. 6C, another alternative shifter 670 is shown. In this example shifter 670 is part of steering wheel 610. Actuation of first shift paddle 614 and a second shift paddle 612 determine when the transmission is shifted via manually operating first shift paddle 614 and second shift paddle 612. In one example, the transmission is upshifted when first shift paddle 614 is actuated. The transmission is downshifted when the second shift paddle 612 is actuated. The transmission may be shifted or simulated shifted though all transmission gears or a subset of transmission gears. For example, if the transmission has twelve gears, the transmission may shift to gears one, three, five, seven, nine, and eleven when the same group of gears is assigned to first and second shift paddles 612 and 614. Shifter 670 may also be accompanied by a shift lever (not shown) that places the transmission in park, reverse, or drive. The first shift paddle 614 and the second shift paddle 612 are only operative in drive.

Thus, automatic transmissions may be shifted manually by one of the manual gear selection devices shown in FIGS. 5A to 6C. The transmissions may be manually shifted using the devices shown in FIGS. 5A to 6C without the driver applying a clutch. Further, multiple gear sets may be assigned to a single manual mode gear shifter position slot. Additionally, where the driveline does not include multiple gear sets to shift between, shifting between gears may be simulated via controlling torque of a motor in the driveline.

Referring now to FIG. 7A, an example human machine interface (HMI) for operating a vehicle driveline is shown. The HMI may be a touch screen display device 702 or another device that allows gears to be assigned to manual gear position slots. The HMI may also interface with controller 12 so that controller 12 may determine when to shift a transmission or simulate transmission shifting via a motor in the vehicle driveline. In this example, HMI 700 includes an icon 705 that is representative of the shifter. HMI 700 also displays a selection of available transmission gears 710. Available transmission gears may be assigned to a manual gear shifter position slots at gear assignment table 712. The driver may assign a transmission gear to a manual gear shifter position slot by touching one of the available gears. The selected gear is highlighted or show as selected and then the manual shifter position slot is selected so that the highlighted gear is assigned to the selected manual shifter position slot. In this example, fourth gear is selected as indicated by circle 706. Fourth gear is assigned to the second manual shifter position slot via selecting the second manual shifter position slot by pressing the select option 704. Selected gears assigned to manual shifter position slots are displayed above their corresponding manual shifter position slots. Selected gears may also be skipped over during shifting in manual move via applying the skip option 708 when a particular gear is selected. Gears to be skipped during shifting are covered by an X. Thus, in FIG. 7A only a fraction of the twelve available gears are assigned to manual shifter position slots.

FIG. 7B shows gear assignment table 712 in a gear assignment complete state. The available transmission gears are removed from display device 702 and each gear is shown next to its assigned corresponding manual shifter position slot. Gears that will be skipped over and not engaged during manual shifting are shown covered by an X. Thus, display device 702 allows gears to be assigned to manual mode gear shifter position slots. Further, display device 702 allows the driver to implement skip shifting to avoid a large number of gear shifts.

Thus, a system comprised of the devices shown in FIGS. 1-7B provides for a vehicle system, comprising: a human machine interface; and a controller including non-transitory instructions executable to prompt a driver to assign a plurality of simulated transmission gear ratios to a plurality of gear shifter position slots via the human machine interface. The vehicle system further comprises a motor and additional instructions to simulate shifting through the plurality of transmission gear ratios via the motor in response to vehicle operating conditions. The vehicle system further comprises a fixed ratio gear box. The vehicle system includes where a number of transmission gear ratios included in the plurality of simulated gear ratios is greater than a number of gear shifter position slots included in the plurality of gear shifter position slots. The vehicle system further comprises additional instructions to skip shifting to a gear assigned to one of the plurality of gear shifter position slots. The vehicle system further comprises additional instructions to automatically assign the plurality of transmission gear ratios to the plurality of gear shifter position slots without driver input.

Figure 8:
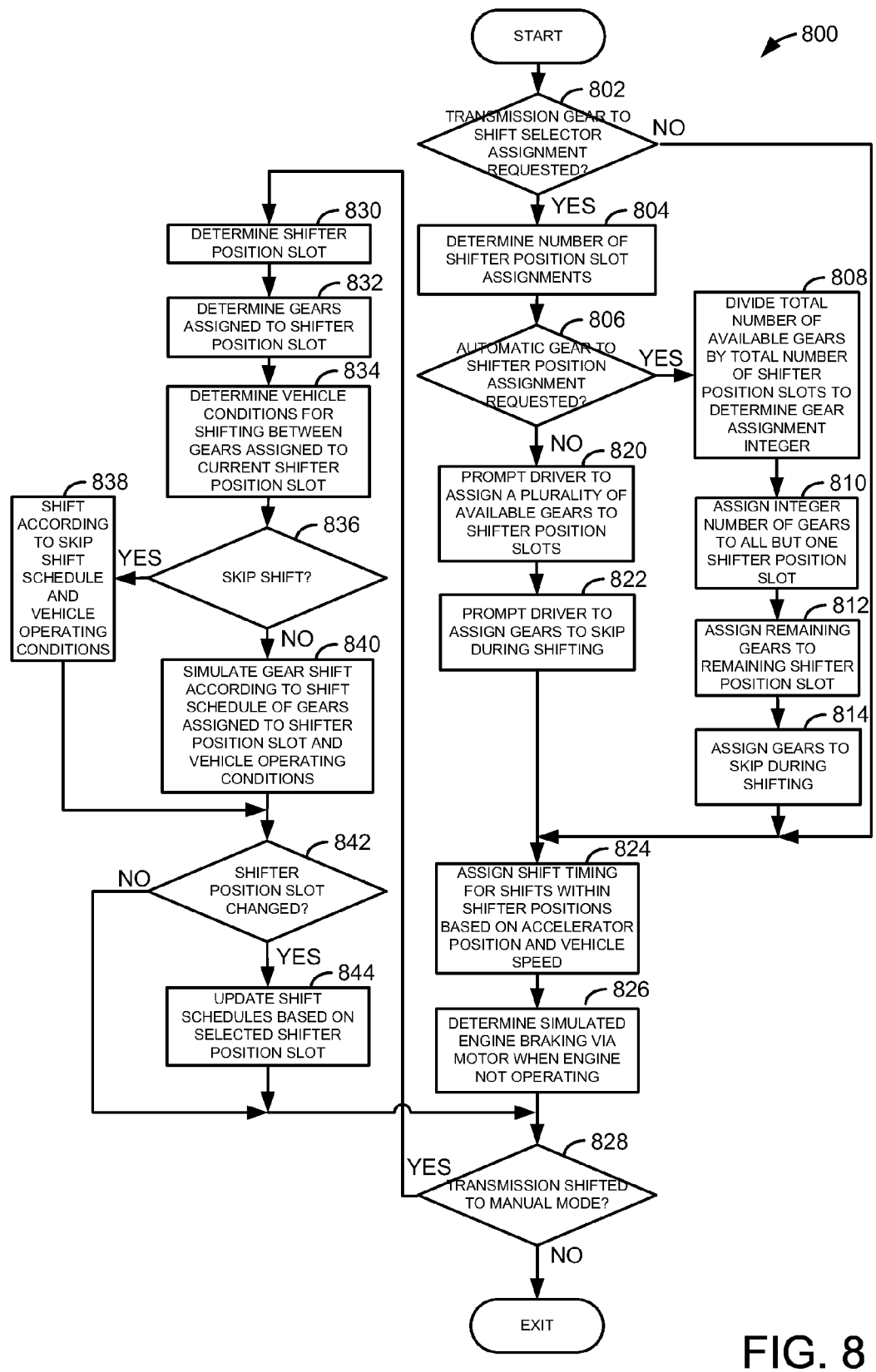
FIG. 8 is a flowchart showing one example method for operating a vehicle driveline.

Referring now to FIG. 8, a flowchart of a method for operating a vehicle driveline is shown. The method of FIG. 8 may be included as executable instructions stored in non-transitory memory of controller 12 shown in FIG. 1. Further, the method of FIG. 8 may be part of a system that includes one or more of the devices and/or subsystems shown in FIGS. 1-7.

At 802, method 800 judges whether or not a request to assign transmission gears to manual mode gear shifter positions slots is present. The gear shifter position slots may be as shown in FIGS. 5A-6A. Alternatively, toggle switch positions or shift paddles may be assigned gears instead of manual mode gear shifter position slots. A request to assign transmission gears to manual mode gear shifter position slots may be made via a driver making a selection on a display. If method 800 judges that a request to assign transmission gears to manual mode gear shifter position slots is present, the answer is yes and method 800 proceeds to 804. Otherwise, the answer is no and method 800 proceeds to 824.

At 804, method 800 determines a number of manual mode shifter position slot assignments. In one example, the number of manual mode shifter position slots is stored in memory and retrieved from memory when reassignment of transmission gears to manual mode shifter position slots is requested. Method 800 proceeds to 806 after the number of manual mode shifter position slots is determined. It should be noted that the manual mode shifter position slots may be two for toggle shifters shown in FIG. 6B, paddle shifters shown in FIG. 6C, or the shifter shown in FIG. 6A. In other words, positions of toggle switches, paddle shifters, or the shifter shown in FIG. 6A may be interchangeably used with or in place of manual mode shifter position slots.

At 806, method 800 judges whether or not automatic transmission gear to shifter position or slot assignment is requested. Automatic assignment of transmission gears to manual mode shifter position slots may be a default mode for assigning transmission gears to manual mode shifter position slots. However, the driver may make a specific request to manually assign transmission gears or simulated transmission gears to manual mode shifter position slots. If method 800 judges that automatic assignment of transmission gears to manual mode shifter position slots is requested, the answer is yes and method 800 proceeds to 808. Otherwise, the answer is no and method 800 proceeds to 820.

At 808, method 800 divides the total number of available gears by a total number of manual mode shifter position slots to determine a gear assignment integer. The gear assignment integer is the whole number of times the number of manual mode shifter position slots goes into the number of transmission gears or simulated transmission gears. For example, if the number of transmission gears is twelve and the number of manual mode shifter position slots is five, the assignment integer is two. The remainder is discarded. Method 800 proceeds to 810 after the assignment integer is determined.

At 810, method 800 assigns the gears to the manual mode shifter position slots. Each manual mode shifter position slot, except the last manual mode shifter position slot, is assigned a number of transmission gears. The number of transmission gears assigned to a manual mode shifter position slot is equal to the assignment integer. The manual mode shifter position slots are assigned transmission gears sequentially up to the assignment number. For example, if the transmission includes thirteen gears and six manual mode shifter position slots, the first manual mode shifter position slot is assigned gears one and two, the second manual mode shifter position slot is assigned gears three and four, and so on up to the fifth manual mode shifter position slot. Method 800 proceeds to 812 after assigning all but the sixth (e.g., the last) manual mode shifter position slot transmission gears.

At 812, method 800 assigns the remaining transmission gears to the sixth and last manual mode shifter position slot. Since ten gears are assigned to the first five manual mode shifter position slots at 810, the sixth manual mode shifter position slot is assigned transmission gears eleven through thirteen. Method 800 proceeds to 814 after all transmission gears have been assigned to manual mode shifter position slots.

If the shifter has only upshift and downshift manual mode shifter position slots or states, all gears may be assigned to the upshift and downshift position slots. Alternatively, a fraction of the total number of all transmission gears may be assigned to the upshift and downshift positions slots. For example, gears one, three, five, seven, nine, and eleven of a twelve gear transmission may be assigned to the manual shifter. The remaining six gears may be assigned to be skipped at 814.

At 814, method 800 assigns gears to be skipped during manual mode shifting. In one example, method 800 automatically skips every other gear of the transmission. Thus, method 800 shifts to only six of twelve transmission gears of a twelve gear transmission. In other examples, method 800 does not skip any transmission gears during manual shifting. Method 800 proceeds to 824 after gears not to be engaged are assigned.

At 820, method 800 prompts the driver to assign a plurality of available transmission gears or simulated transmission gears to manual mode shifter position slots. In one example, the driver assigns available transmission gears to manual mode shifter position slots as is described in the description of FIGS. 7A and 7B. The driver may assign one or more transmission gears to each of the manual mode shifter position slots. The gears assigned to a manual mode shifter position slot may be engaged when the shifter is positioned at the manual mode shifter position slot unless the gear is assigned to be skipped. Method 800 proceeds to 822 after the driver has been prompted to assign transmission gears or simulated transmission gears to manual mode gear position slots.

At 824, method 800 assigns gear shift timing for gear shifts within manual mode gear position slots. In one example, shifting between gears assigned to a manual mode gear position slot is based on accelerator pedal position and vehicle speed. For example, if transmission gears three and four are assigned to a manual mode gear position slot, the shift from third gear to fourth gear may be initiated without driver input to the manual shifter when the accelerator pedal is 30% of full accelerator pedal travel and when vehicle speed is 45 KPH. In one example, the timing and/or conditions for shifting between gears assigned to a manual mode gear position slot may be empirically determined and stored in memory. Further, in some examples, a base transmission shift schedule is adjusted for more aggressive shifting when manual shifting is activated and gear shifting is taking place while the shifter in a manual mode gear position slot. For example, a base shift schedule may shift from fourth gear to fifth gear at 60 KPH and an accelerator pedal position of 32% of full accelerator pedal travel. The same shift may be scheduled at 65 KPH and 35% of full accelerator pedal travel in manual shift mode.

Additionally, an accelerator pedal transfer function that relates accelerator pedal position to driver demand torque may be adjusted based on whether or not manual mode shifting is activated. In one example, manual mode shifting is activated when a shifter is moved to a manual gear slot. The accelerator pedal transfer function relating driver demand torque to accelerator pedal position may be made more aggressive (e.g., a higher driver demand torque for less accelerator pedal input) when the transmission is shifted to manual mode. Method 800 proceeds to 826 after shift timing is adjusted.

The gears described at 808-822 may be actual gears of a transmission or gears that are simulated via adjusting torque of a motor. Gears may be simulated for a CVT transmission system as shown in FIG. 4 or the single ratio gear system shown in FIG. 3.

At 826, method 800 determines simulate engine braking via a motor in the vehicle driveline when the engine is not rotating. In one example, engine torques at different engine speeds where the engine throttle is closed and where the vehicle is decelerating are measured and stored to memory. The motor may be commanded to the same stored torques when transmission gear shifting is being simulated while the vehicle is decelerating. Method 800 proceeds to 828 after simulated engine braking torques are determined.

At 828, method 800 judges whether or not the transmission is to be operated in a manual shift mode. In a manual shift mode, the times between at least some gear changes is based on when a driver repositions a shift lever, toggle switch, paddle shifter, or other device to indicate the driver is commanding a shift. The driver need not apply a clutch and no clutch application device may be available to the driver. In one example, manual shift mode is entered when a shifter enters a manual mode gear shifter position slot. If method 800 judges the vehicle is in a manual shift mode, the answer is yes and method 800 proceeds to 830. Otherwise, the answer is no and method 800 shifts according to base operation in drive mode and exits.

Base operation in drive mode may include shifting through transmission gears without driver commands to shift the transmission. For drivelines that include only a single ratio driveline, simulated gear shifting is not provided in drive mode. Likewise, for drivelines that include a CVT, simulated gear shifting is not provided in drive mode or outside of manual mode.

At 830, method 800 determines a position of a shift lever in a manual mode gear shifter position slot. In one example, the shift lever position may be indicated via a position sensor. Method 800 proceeds to 832 after shifter position is determined.

At 832, method 800 determines gears that are assigned to the manual mode gear shifter position slot where the shift lever is positioned. In one example, the gear assignments for manual mode gear shifter position slots are stored in memory and retrieved as necessary.

At 834, method 800 determines conditions for shifting between gears assigned to the present manual mode gear shifter position slot where the shift lever, toggle, or paddle is presently situated. The conditions may include but are not limited to vehicle speed, accelerator position, engine torque demand, engine temperature, and transmission temperature. If the manual shifter has only upshift and downshift positions as described for the shifters in FIG. 6A through 6C, 834 may be omitted or bypassed. Method 800 proceeds to 836 after shifting conditions are determined.

At 836, method 800 judges whether or not skip shifting is desired. In one example, skip shifting may be desirable when the driver assigns gears to be skipped or not engaged at 822 or when gears are assigned automatically to be skipped at 814. If method judges skip shifting is desired, the answer is yes and method 800 proceeds to 838. Otherwise, the answer is no and method 800 proceeds to 840.

At 838, method 800 shifts transmission gears according to a skip shift schedule and vehicle operating conditions. For example, if transmission gears three, four, and five are assigned to a manual mode gear shifter position slot, toggle, or paddle and gear four is to be skipped according to 822 or 814, the transmission may be shifted from third gear to fifth gear or vice versa when vehicle conditions match shifting conditions. In one example, engine torque demand and vehicle speed are increased when a skip shift is desired or commanded so that engine or motor speed is not reduced more than a desired amount after a transmission upshift. The transmission shifting schedule including skip shifting is based on driver assigned gears at 820-822 or automatically assigned gears at 808-814. If the shifter includes only upshift and downshift manual shifter position slots, toggle, or paddles, the transmission may skip shifting to gears identified as skip shift gears and only shift to gears that are not indicated as skip shift gears. Method 800 proceeds to 842 after the transmission is shifted according to a schedule that skips or does not engage shifting into selected gears. The descriptions of FIGS. 5A-6C provide example shifting descriptions for different manual shift devices supported by and according to the method of FIG. 8.

At 840, method 800 shifts the transmission according to the gears assigned the manual shifter position slots, toggle, or paddles without skipping gears. The gears assigned to a particular manual shifter position slot are determined at 820 and 810-812. Method 800 proceeds to 842 after the transmission begins shifting according to the gears assigned to the manual shifter position slot. If only the motor is providing torque to the driveline (e.g., when a driveline disconnect clutch is open or when the engine has stopped rotating), gear shifts for a multiple step gear ratio transmission (e.g., a transmission having five different gear ratios defined by five gears) may be simulated in a driveline that includes a single fixed ratio gear box or CVT absent the multiple step gear ratio transmission via operating the motor in a torque limiting mode. For example, motor torque may be limited based on motor speed as shown and described in the description of FIG. 9 to simulate shifting of a multiple step ratio transmission.

Figure 9:
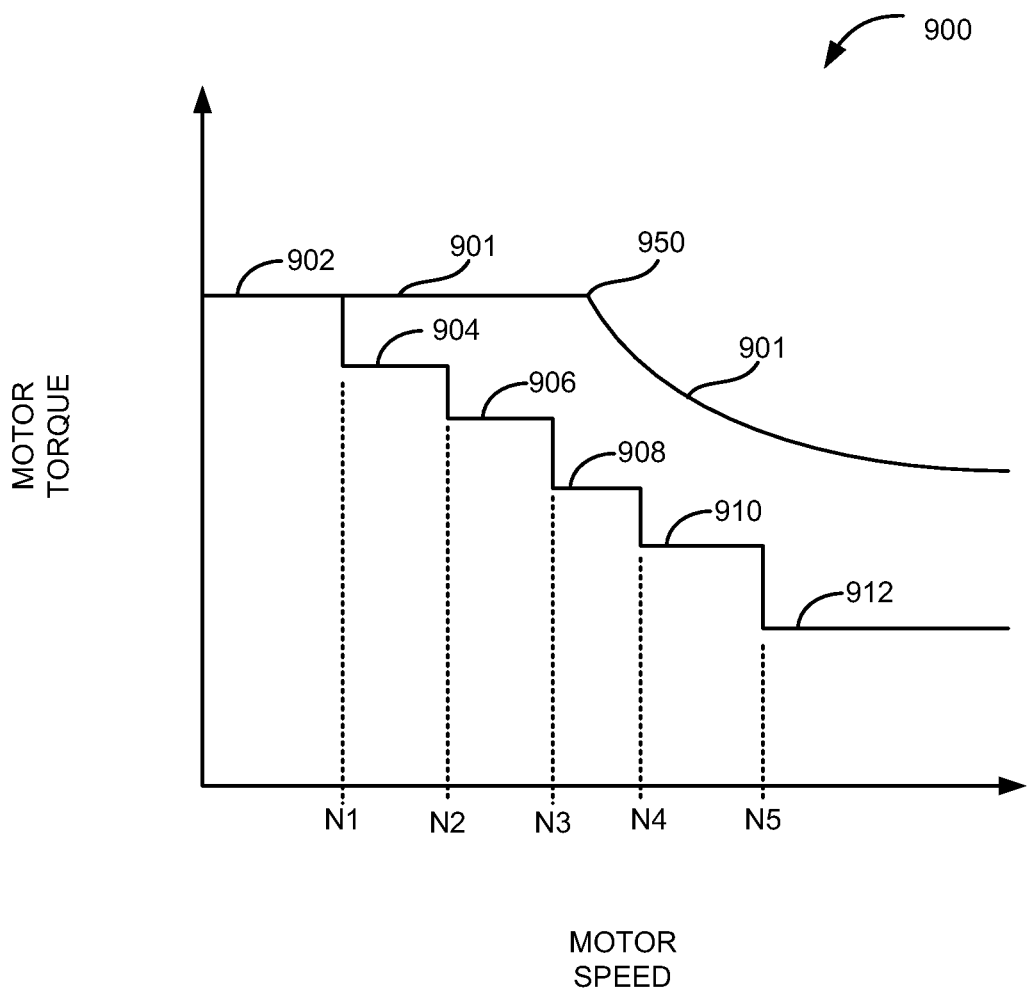
FIG. 9 is an example plot of motor torque allocated to simulated gears.

It should also be noted that controller 12 may simulate shifting and skip shifting at 840 and 838 according to the transmission shift schedules that are based on transmission gears assigned to manual shifter position slots. Transmission shifting may be simulated via adjusting motor torque according to the presently selected gear. In one example, all available motor torque may be provided to the vehicle drive line when the transmission is simulated in first gear. Less than the total available amount of motor torque may be provided to the drive line when the transmission is simulated to be in second gear. Similarly, less motor torque is available to the vehicle driveline as the simulated gear number is increased (e.g., less torque in the eight simulated gear). Likewise, more motor torque is available to the vehicle driveline as the simulated gear is decreased or downshifted. FIG. 9 shows an example motor torque map for simulating shifting gears of a multiple step ratio transmission.

In addition to simulated shifting, the motor may simulate engine braking in the selected simulated gears via operating the motor in a regeneration mode and providing a negative driveline torque that is based on the simulated engine speed and engine torque when the vehicle is decelerating at a light load. Thus, a transmission or simulation of a multiple gear transmission provided by a motor may shift gears according to vehicle operating conditions and the gears selected for manual mode operation. The engine may not be rotating when the motor is simulating engine braking.

At 842, method 800 judges whether or not the shift lever has moved from one manual shifter position slot to another manual shifter position slot. In one example, position sensors change state to indicate that the manual shift lever has changed positions. If method 800 judges that the shift lever position has changed, the answer is yes and method 800 proceeds to 844. Otherwise, the answer is no and method 800 proceeds to 828.

At 844, method 800 updates shifting schedules for shifting between different gears when the shift lever is positioned in a manual position slot, toggle state, or paddle state that is assigned more than one transmission gear. For example, if the shift lever is moved from a first position where transmission gears three and four are assigned to be engaged to a second position where transmission gears five and six are assigned to be engaged, the transmission shift schedule is updated to shift the transmission between gears five and six according to a shift schedule for shifting from fifth gear to sixth gear, or vice versa. Method 800 proceeds to 828 after the shift schedule is updated for the change in shift lever position.

Thus, the method of FIG. 8 provides for operating a driveline, comprising: assigning a first number of simulated transmission gears to a first number of gear shifter position slots, the first number of transmission gears greater than the first number of gear shifter position slots; and simulating shifting of a multiple step gear ratio transmission for a driveline having a single fixed ratio gear box absent the multiple step gear ratio transmission in response to a position of a gear shifter in a gear shifter position slot, the gear shifter position slot included in the first number of gear shifter positions. The method includes where the first number of simulated transmission gears is a number of simulated transmission gears. The method includes where the first number of transmission gears is a number of gears in the transmission. The method further comprises simulating changing gears when the gear shifter is moved from a first gear position slot to a second gear position slot, and where a driver is prompted to assign the first number of simulated transmission gears to the first number of gear shifter position slots.

In one example, the method includes where assigning the first number of simulated transmission gears includes assigning more than one transmission gear to the gear shifter position slot. The method further comprises skipping shifting to a gear assigned to the gear shifter position slot in response to driver input indicating which gear assigned to the gear shifter slot is skipped. The method further comprises adjusting gear shift timing of gears assigned to a gear shifter position slot.

In another example, the method of FIG. 8 provides for operating a driveline, comprising: prompting a driver to assign a first number of simulated transmission gears to a first number of gear shifter position slots; and simulating shifting a transmission when a position of a gear shifter moves from a first gear shifter position slot to a second gear shifter position slot, the first gear shifter position slot and the second gear shifter position slot included in the first number of gear shifter position slots, where the driveline includes a continuously variable transmission or a single fixed gear ratio gear box, and where the driveline does not include a stepped ratio transmission that is adjustable between different gear ratios.

In some examples, the method includes where torque of a motor is adjusted to simulate shifting the transmission. The method includes where torque of the motor is reduced as the transmission is simulated shifting from a lower gear to a higher gear. The method includes where torque of the motor is increased as the transmission is simulated shifting from a higher gear to a lower gear. The method includes where the transmission is included in a hybrid vehicle that includes an engine and a motor, and further comprising simulating engine braking via the motor when the engine is not operating. The method includes where the motor is operated in a regenerating mode when simulating engine braking. The method includes where the first number of transmission gears is greater than the first gear shifter position slots.

Referring now to FIG. 9, an example plot of motor torque allocated to simulate transmission gears. The plot has a Y axis that represents motor torque and a X axis that represents motor speed. The motor may provide torque according to curve 901. Curve 901 provides a constant amount of torque below the motor speed at 950. Motor torque is reduced at motor speeds greater than the motor speed at 950. Vertical markers at motor speeds N1-N5 represent motor speeds for simulating gear ratios.

A first gear of a transmission may be simulated by limiting motor torque to the level 902 below motor speeds less than N1. Second gear of the transmission may be simulated by limiting motor torque to the level 904 below motor speeds less than N2. Third gear of the transmission may be simulated by limiting motor torque to the level 906 below motor speeds less than N3. Fourth gear of the transmission may be simulated by limiting motor torque to the level 908 below motor speeds less than N4. Fifth gear of the transmission may be simulated by limiting motor torque to the level 910 below motor speeds less than N5. Sixth gear of the transmission may be simulated by limiting motor torque to the level 912. In other examples, the simulated number of gear ratios may be increased or decreased. Further, in some examples, method 800 of FIG. 6 may not allow simulation of higher gear ratios at lower motor or driveline speeds.

As will be appreciated by one of ordinary skill in the art, method described in FIG. 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
   assigning a first number of simulated transmission gears to a first number of gear shifter position slots, the first number of simulated transmission gears greater than the first number of gear shifter position slots; and
   simulating shifting of a multiple-step gear ratio transmission for a driveline having a single fixed-ratio gear box in response to a position of a gear shifter in a gear shifter position slot included in the first number of gear shifter position slots, and where simulating shifting of the multiple-step gear ratio transmission is performed via limiting torque output of a motor in the driveline.

2. The method of claim 1, where the first number of gear shifter position slots is greater than four, and where at least two simulated transmission gears are assigned to each gear shifter position slot.

3. The method of claim 1, where the first number of simulated transmission gears is greater than four, and where torque output of the motor is limited based on motor speed for each of the first number of simulated transmission gears.

4. The method of claim 3, further comprising simulating changing gears when the gear shifter is moved from a first gear position slot to a second gear position slot, and where a driver is prompted to assign the first number of simulated transmission gears to the first number of gear shifter position slots.

5. The method of claim 1, where assigning the first number of simulated transmission gears includes assigning more than one transmission gears to the gear shifter position slot.

6. The method of claim 5, further comprising skipping shifting to a gear assigned to the gear shifter position slot in response to driver input indicating which gear assigned to the gear shifter slot is skipped.

7. The method of claim 1, further comprising adjusting gear shift timing of gears assigned to the gear shifter position slot.

8. A method, comprising:
   prompting a driver to assign a first number of simulated transmission gears to a first number of gear shifter position slots; and
   simulating shifting a transmission of a driveline when a position of a gear shifter moves from a first gear shifter position slot to a second gear shifter position slot, the first gear shifter position slot and the second gear shifter position slot included in the first number of gear shifter position slots, where the driveline includes a continuously variable transmission or a single fixed gear ratio gear box, and where the driveline does not include a multiple-step gear ratio transmission.

9. The method of claim 8, where torque of a motor is adjusted to simulate shifting the transmission.

10. The method of claim 9, where torque of the motor is reduced to simulate simulated shifting from a lower gear to a higher gear.

11. The method of claim 9, where torque of the motor is increased to simulate shifting from a higher gear to a lower gear.

12. The method of claim 8, where the single fixed gear ratio gear box is included in a hybrid vehicle that includes an engine and a motor, and further comprising simulating engine braking via the motor when the engine is not operating.

13. The method of claim 12, where the motor is operated in a regenerating mode when simulating engine braking.

14. The method of claim 8, where the first number of simulated transmission gears is greater than the first gear shifter position slots.

15. A vehicle system, comprising:
   a human machine interface;
   a motor;
   a single fixed gear ratio gear box in communication with the motor; and
   a controller including non-transitory instructions executable to prompt a driver to assign a plurality of simulated transmission gear ratios to a plurality of gear shifter position slots via the human machine interface, and additional instructions to simulate shifting through the plurality of simulated transmission gear ratios via the motor in response to vehicle operating conditions.

16. The vehicle system of claim 15, further comprising additional instructions to simulate engine braking via the motor.

17. The vehicle system of claim 16, where the motor is operated in a regeneration mode to simulate engine braking.

18. The vehicle system of claim 17, where a number of transmission gear ratios included in the plurality of simulated gear ratios is greater than a number of gear shifter position slots included in the plurality of gear shifter position slots.

19. The vehicle system of claim 18, further comprising additional instructions to simulate skip shifting to a simulated transmission gear assigned to one of the plurality of gear shifter position slots.

20. The vehicle system of claim 19, further comprising additional instructions to automatically assign the plurality of simulated transmission gear ratios to the plurality of gear shifter position slots without driver input.

* * * * *